(12) United States Patent
Sabin et al.

(10) Patent No.: US 6,513,516 B2
(45) Date of Patent: Feb. 4, 2003

(54) PORTABLE HEATING/COOLING AND DISPENSING DEVICES

(75) Inventors: Cullen M. Sabin, Cortez, FL (US); Martin W. Sabin, Sarasota, FL (US); Yan Xiong, Bradenton, FL (US)

(73) Assignee: Tempra Technology, Inc., Bradenton, FL (US)

( * ) Notice: Subject to any disclaimer, the term of this patent is extended or adjusted under 35 U.S.C. 154(b) by 0 days.

(21) Appl. No.: 09/798,811

(22) Filed: Mar. 2, 2001

(65) Prior Publication Data

US 2001/0037872 A1 Nov. 8, 2001

Related U.S. Application Data

(60) Provisional application No. 60/186,397, filed on Mar. 2, 2000.

(51) Int. Cl.$^7$ .................................................. F24J 1/00
(52) U.S. Cl. ........................................ 126/263.01; 62/4
(58) Field of Search ........................ 126/263.01, 263.07, 126/375.1, 400; 62/4; 383/104, 120

(56) References Cited

U.S. PATENT DOCUMENTS

| | | | |
|---|---|---|---|
| 3,683,889 A | | 8/1972 | Hoffman |
| 4,723,974 A | * | 2/1988 | Ammerman ..................... 62/4 |
| 4,816,048 A | | 3/1989 | Kimmelshue |
| 5,534,020 A | | 7/1996 | Cheney, III et al. |
| 5,809,786 A | | 9/1998 | Scudder et al. |
| 6,267,110 B1 | * | 7/2001 | Tenenboum et al. ......... 126/262 |
| 6,289,889 B1 | * | 9/2001 | Bell et al. ............... 126/263.07 |

* cited by examiner

*Primary Examiner*—Sara Clarke
(74) *Attorney, Agent, or Firm*—Fish & Richardson P.C.

(57) ABSTRACT

A self-contained device for heating/dispensing or cooling/dispensing material is described. The device includes at least one heat- or cold-generating element and at least one container for containing material to be heated or cooled. The device can further be equipped with gussets or similar features to allow free-standing.

16 Claims, 5 Drawing Sheets

PORTABLE HEATING/COOLING AND DISPENSING DEVICES

This application claims the benefit of Provisional Application No. 60/186,387, filed Mar. 2, 2000.

TECHNICAL FIELD

This invention relates to heating and dispensing, or alternatively, cooling and dispensing, food, beverages and other materials, and more particularly to devices and methods for self-contained heating and dispensing, or alternatively, cooling and dispensing, of food, beverages and other materials.

BACKGROUND

Portable heating and cooling devices are known. Compact, self-heating devices that produce heat through exothermic chemical reactions are known. For example, U.S. Pat. No. 4,397,315 discloses a device having an outer envelope and an inner envelope, with the outer envelope containing sodium thiosulfate, and the inner envelope containing ethylene glycol. The walls of the inner envelope are rupturable, allowing the contents of each envelope to mix. U.S. Pat. No. 5,035,230 discloses a heat pack having two compartments separated by a frangible seal. Potassium permanganate oxidizing agent coated with sodium silicate is provided in one zone of the heat pack, and aqueous ethylene glycol fuel is provided in the other zone. In operation of the device, a seal between the two zones is compromised to allow the reactants to come in contact with each other. U.S. Pat. No. 6,116,231 discloses another heat pack having two compartments separated by a frangible seal, in which gelling agent is employed to assist in the regulation of heat evolution in the heat pack. U.S. Pat. No. 5,984,953 discloses another heat pack having two compartments in which a stifffenable gel is employed, along with the evaporation and reversible removal of solvent from the gel to assist in the regulation of heat evolution in the heat pack.

Devices for producing heat or cold by heat of dilution rather than by chemical reaction are also known. U.S. Pat. No. 3,804,077 describes a heat pack which contains a water soluble chemical (e.g., calcium chloride) and a starch material acting as a gelling agent in one zone, and water in another zone.

Devices for producing cold by mixing of materials are also known. U.S. Pat. No. 6,099,555, for example, describes a cold pack having two compartments separated by a frangible seal, in which gelling agent is employed to assist in the regulation of cold evolution in the cold pack.

However, transfer of hot or cold food or beverage from any of these prior art heating or cooling devices to an unheated vessel can result in rapid cooling (or warming) of the food or beverage. The food or beverage could be undesirably cool (or warm) within a short period of time.

SUMMARY

The invention involves a single-use, disposable heater that can heat a quantity of material to a desired temperature. Alternatively, the invention relates to a cooling device that can cool a quantity of material to a desired temperature. Either device can also serve as a container from which to dispense or further utilize the container's contents.

In one aspect, the invention provides a self-contained device for heating material and dispensing the heated material. The device includes at least one activatable heat-generating element, and at least one container for containing material to be heated by the heat-generating element. The container is in thermal contact with the heat-generating element, and the container includes an openable seal, which can be a repeatably openable seal. The material to be heated can be contained within the device prior to activation of the heat-generating element. The container can be made of, for example, polyethylene, polypropylene, polyester, metal foil, metallized plastic film, rubber, vinyl, or vinyl-coated fabric. The heat-generating element can include a heat pack providing heat through an exothermic chemical reaction, such as a reduction-oxidation reaction. The heat pack can include an oxidizing agent, a fuel, and a solvent, with the oxidizing agent and fuel separated by a frangible seal. The heat pack can also include a gelling agent, which can, for example, form a gel upon activation of the heat pack. The heat pack can also include a phase-change material. The heat pack itself can include an envelope made of, for example, polyethylene, polypropylene, polyester, metal foil, metallized plastic film, rubber, vinyl, or vinyl-coated fabric. The device can be made able to stand upright, for example by the use of gussets.

In another aspect, the invention provides a method for heating material. The method includes the steps of activating a heat-generating element of the device described above, filling the container with a material to be heated, and allowing the material to be heated to a desired temperature. The step of filling can be performed prior to the step of activating.

In yet a further aspect, the invention provides a self-contained device for cooling material and dispensing heated material. The device includes at least one activatable cold-generating element, and at least one container for containing material to be cooled by said cold-generating element. The container is in thermal contact with the cold-generating element, and the container includes an openable seal. The cold-generating element can include a cold pack providing cold through a dilution reaction. The cold pack can also include a gelling agent. The device can be made able to stand upright, for example, by using gussets.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. All publications, patent applications, patents, and other references mentioned herein are incorporated by reference in their entirety. In case of conflict, the present specification, including definitions, will control. In addition, the materials, methods, and examples are illustrative only and not intended to be limiting.

Other features and advantages of the invention will be apparent from the following detailed description, and from the claims.

DETAILED DESCRIPTION

Figure 1:
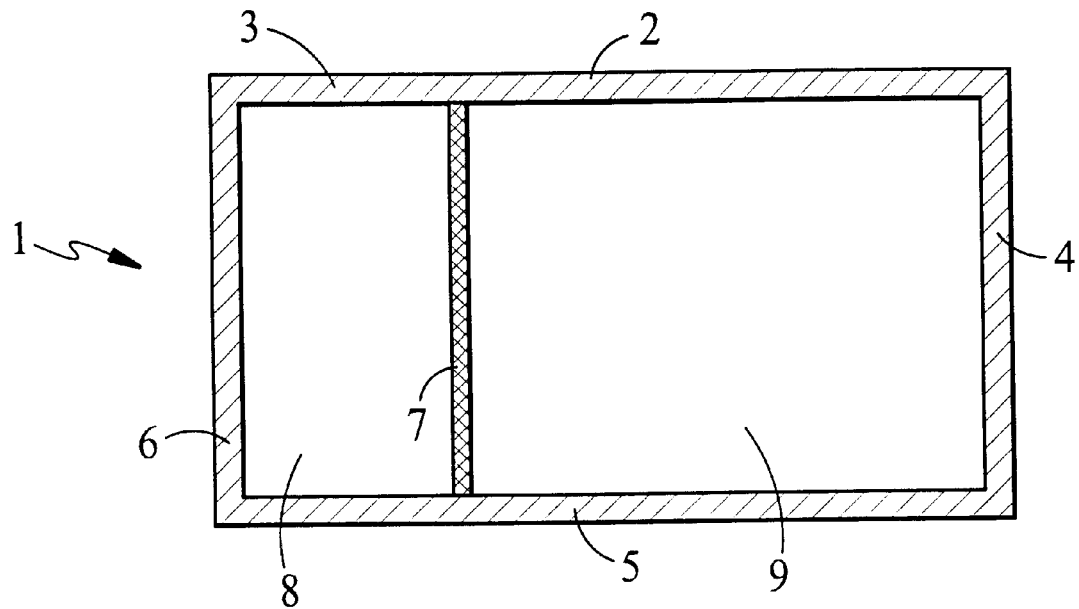
FIG. 1 is an overhead planar view of a first type of pack that can be included in one embodiment of a heating/dispensing or cooling/dispensing device.

The invention includes a self-contained heating device having a number of containers in thermal contact with each other. At least one of the containers contains materials which can be reacted together to produce heat during operation of the device. At least one other container contains material to be heated. Further, the invention includes a self-contained cooling device having a number of containers in thermal contact with each other. At least one of the containers contains materials which can be reacted together to produce cold during operation of the device. At least one other container contains material to be cooled.

In particular embodiments, the device is adapted to be able to stand upright, that is, in a position so that it can be used as an open vessel from which the heated or cooled contents may be readily dispensed or otherwise utilized. An upright position is one in which the device is stable and does not allow the contents of the container to spill or leak out. The device can also include insulation, for example, surrounding the containers.

Heat-Producing Elements

The device can include at least one container comprising a heat pack which provides heat through a moderated exothermic chemical reaction between particular reactants, physically separated zones, or compartments, containing chemical reactants. The heat pack includes two types of zones. The first type of zone contains an oxidizing agent, and, where necessary or desirable, a solvent. The second type of zone contains liquid comprising a fuel, and, where necessary or desirable, a solvent. Oxidizing agents, fuels and solvents suitable for use in heat packs to be employed in the present device are described in U.S. Pat. No. 6,116,231, entitled "Liquid Heat Pack," and U.S. Pat. No. 5,984,953 entitled "Self-Regulating Heat Pack" each of which is hereby incorporated by reference in its entirety. For example, in particular embodiments, heat packs can employ oxidizing agents including these comprising the alkali metal salts of the oxides of manganese or chromium such as potassium permanganate, potassium chromate and others.

The fuels for use in heat packs useful with the claimed invention must be complementary with the oxidizing agent. That is, the combination of oxidizing agent and fuel must provide a desired heat output, meet government safety standards, and be compact. In one of the preferred embodiments, the fuel comprises organic alcohols, such as poly-hydroxy containing compounds. These include glycerine and similar polyols.

To avoid undesirably rapid heat evolution, the reactants can be diluted in a solvent, such as water, in some preferred embodiments, the oxidizing agent is potassium permanganate, the fuel is glycerine, and the solvent is water.

In one or both types of zones a non-fuel gelling agent can be optionally included. The gelling agent does not form a gel before activation of the device, but upon activation of the device, it can form a non-fuel gel. Between the two types of zones is a separator. The separator can be operated or compromised to establish communication between the two types of zones. Separators and gelling agents suitable for use in heat packs to be employed in the present device are described in U.S. patent application Ser. No. 09/021,927, entitled "Liquid Heat Pack," filed Feb. 11, 1998; and U.S. Pat. No. 5,984,953 entitled "Self-Regulating Heat Pack" each of which is hereby incorporated by reference in its entirety. For example, in particular embodiments, the fuel and oxidizing agent come into contact with one another by opening, selectively perforating, rupturing or otherwise compromising the separator between the zones. It is preferred that the separator comprises a material that allows its rupture, perforation or compromise when manual pressure is applied, such as by manual deformation. In preferred embodiments, the separator comprises a brittle or weakened wall extending between the zones, which is manually separable, thereby compromising the separator.

Upon exposure of the oxidizing agent and fuel to each other, one way to control the possibility of undesirably rapid heat evolution is by activating a non-fuel gelling agent, which can produce a gel. In preferred embodiments, the exothermic chemical reaction and gelation begin substantially simultaneously. Organic or inorganic gelling agents can be used, for example metal oxides or alkali metal salts of metal oxides, such as zinc oxide, tin oxide, titanium oxide, zirconium oxide, and silicates and aluminates.

Organic gelling agents can include starches, polyacrylamides, polyols such as pentaerythritol, or proteinaceous materials. Among some preferred embodiments, sodium silicate is useful inorganic gelling agent, and starches are useful organic gelling agents; particularly cold water hydrating starches having viscosities of at least 300 Brabender Units at 95° C.

Upon operation or compromise of the separator, communication is established between the zones, thereby bringing the two liquids (or a liquid and a solid), and hence the oxidizing agent and the fuel, into contact with each other. This initiates an exothermic chemical reaction. If a gelling agent is present, the gelling agent forms a gel within the heat pack. The zones can be configured so that one zone is contained within a pouch, which is itself contained within the other zone; this is a so-called "bag-in-bag" configuration.

The heat pack can comprise a thin-walled envelope that conforms to the shape of its surroundings, and can also be made of a polymeric material. The heat pack container can comprise any material which is reasonably thermally conductive, is not deleteriously affected by the contents it is meant to hold, and is resistant to the temperature to be achieved. The container can have any degree of rigidity or flexibility. For example the container can be made of a rigid material such as a rigid thermoplastic, or a metal such as aluminum. Altheratively, the container can be made of a flexible material. Such materials include polyethylene, polypropylene, polyester (such as MYLAR®, film obtainable from DuPont) aluminum, aluminized polymer film, including for example, metallized SURLYN®; and other conventional plastic or other packaging materials suitable for containing heated liquids such as rubber, vinyl, vinyl-coated fabric and polyethylene. A thickness of about 0.02 mm to about 0.1 mm has been found to be satisfactory using clear vinyl.

Referring to FIG. 1, there is displayed an overhead planar view of one of the preferred embodiments of the devices of the invention. The heat pack 1 is composed of a container having an upper sheet 2 and a lower sheet (not shown). The sheets are sealed together at the edges by edge seals 3, 4, 5 and 6. These edge seals are preferably made so that they are not readily opened by the consumer. A separator 7 is disposed from one edge seal of the heat pack 1 to another edge seal, thus dividing the heat pack 1 into two zones, 8 and 9. The separator is preferably made to be readily compromised by the consumer.

Figure 2:
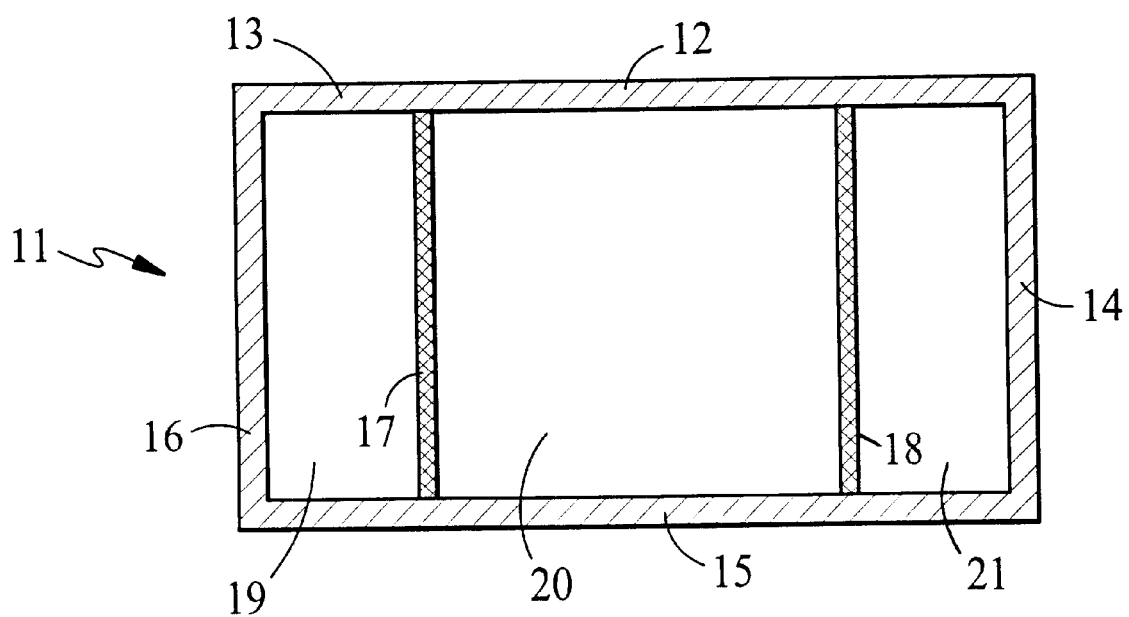
FIG. 2 is an overhead planar view of a second type of pack that can be included in one embodiment of a heating/dispensing or cooling/dispensing device.

Alternate embodiments of the device are also contemplated. For example, there may be more than one frangible seal, resulting in a device divided into more than two zones. This is depicted in FIG. 2, which shows a heat pack 11 composed of a container having an upper sheet 12 and a lower sheet (not shown). The sheets are sealed together at the edges by edge seals 13, 14, 15, and 16. These edge seals are preferably made so that they are not readily opened by the consumer. A pair of separators 17 and 18 are disposed from one edge seal of the pack 11 to another edge seal, thus dividing the heat pack 11 into three zones, 19, 20 and 21. The separator is preferably made to be readily compromised by the consumer.

Figure 3:
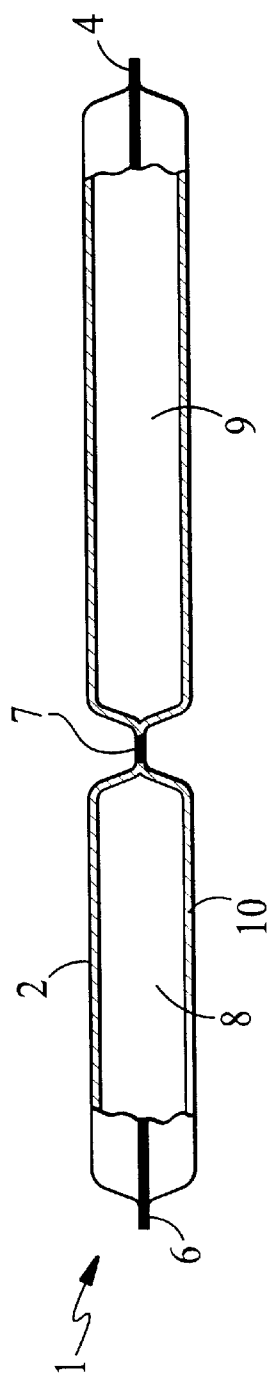
FIG. 3 is a sectional view of a pack that can be included in one embodiment of a heating/dispensing or cooling/dispensing device.
Figure 4:
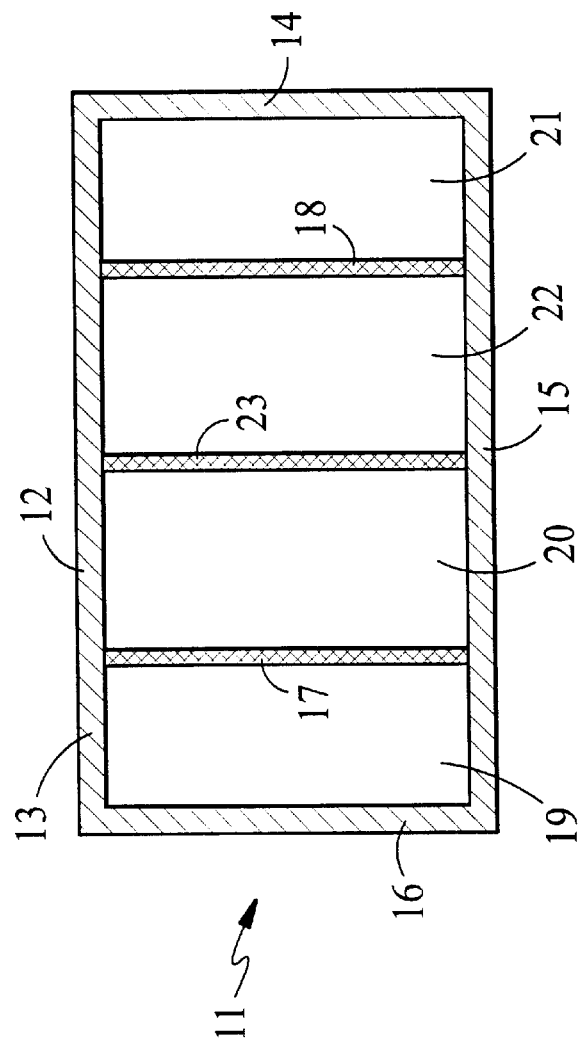
FIG. 4 is an overhead planar view of a third type of pack that can be included in one embodiment of a heating/dispensing or cooling/dispensing device.

FIG. 3 shows a section view of the embodiment shown in FIG. 1, with the inclusion of the lower sheet 10. Turning to FIG. 4, an embodiment of the invention having a pair of zones of one type 19 and 21, and a pair of zones of the other type 20 and 22. Separator 23 is disposed between this latter pair of zones.

The heat packs can be solid oxidizing agent-containing heat packs, such as those disclosed in U.S. Pat. No. 5,035,230. The oxidizing agent can also include a liquid component. Liquid heat packs which include gelling agents are described in U.S. patent application Ser. No. 09/021,927, filed Feb. 11, 1998, entitled "Liquid Heat Pack," which is hereby incorporated by reference in its entirety.

Other heat packs which include further methods of moderating heat production are described in U.S. Pat. No. 5,984,953, entitled "Self-Regulating Heat Pack," which is hereby incorporated by reference in its entirety. For example, in some embodiments, the heat pack will have a vapor space and container inner surface into and onto which the solvent can vaporize or condense, so that a formed gel can become stiffer, thereby increasing the effective viscosity of the reaction, and slowing the exothermic reaction. This process is driven by heat, so that the reaction acts as an effective brake on the reaction, preventing runaway heat evolution.

The heat packs can also contain other ingredients such as phase change materials, as described in U.S. patent application Ser. No. 09/021,927, entitled "Liquid Heat Pack," filed Feb. 11, 1998; and U.S. Pat. No. 5,984,953 entitled "Self-Regulating Heat Pack" each of which hereby incorporated by reference in its entirety. Phase change materials are designed to utilize latent heat absorption associated with a reversible phase change transition, such as a solid-liquid transition. An approach which has found success is encapsulation of the phase change materials within a thin membrane or shell. Such capsules are known as microcapsules, with sizes from about 1.0 to about 1000 microns. The phase change materials can be hydrocarbons including paraffinic materials, plastic crystals or inorganic hydrates.

In preferred embodiments, the heat generating elements use solid particles of oxidizing agents and liquid fuels. The solid particles can be coated with a particulate gelling agent, or be present in a zone of the heat pack with a particulate gelling agent. In some of these particular embodiments, evacuation of the zone containing such solid and particulate material is desirable. Construction of evacuated heat packs can be facilitated by methods of manufacture described in U.S. Provisional Patent Application Serial No. 60/186,4?, filed Mar. 2, 2000, entitled "Vacuum Packaging Aid," which is hereby incorporated in its entirety. For example, these methods of manufacture utilize fusible materials that can form a part of the edge seals after vacuum is applied to a oxidizing agent- or fuel-containing zone.

Cold-Producing Elements

The device can include at least one container comprising a cold pack which provides cold through an interaction between particular reactants, located in physically separated zones, or compartments, containing reactants. The cold pack includes two types of zones. Cold packs which can usefully be employed in the present device are described in U.S. Pat. No. 6,099,555 entitled "Gelling Cold Pack," which is hereby incorporated by reference in its entirety. For example, in particular embodiments, cold packs can employ reactants which produce cold through endothermic reactions, or those which exhibit a negative heat of reaction. For example, the dissolution in water of inorganic salts such as ammonium nitrate, potassium nitrate, ammonium sulfate, and ammonium chloride produce cold. Further useful cold-generating materials are organic materials such as urea, and other inorganic salts such as ammonium bromide, ammonium iodide, potassium chloride, tin chloride dihydrate, diamminecobalt, dichlorocobalt hexahydrate, and nickel nitrate hexahydrate.

The material with which the cold-generating material interacts is a liquid. The liquid can be aqueous, that is water, or water containing other components, such as hydroxylic and polyhydroxylic species such as alcohols, glycerol, ethylene glycol, propylene glycol and similar compounds. Additional components of the gelling cold packs of the invention can be, for example, phase change materials.

Gelling agents can also be employed in cold packs, and are either organic or inorganic. Inorganic compounds such as metal oxides, metal alkoxides, or alkali metal salts of metal oxides can be used. These include zinc oxide, tin oxide, titanium oxide, zirconium oxide, and silicates and aluminates in combination with solvents such as water and alcohols. Useful organic gelling agents include organic compounds such as carbohydrates including starch; polyacrylamide; polyols such as pentaerythritol; or proteinaceous materials such as dried gelatin. These agents can form gels in combination with solvents such as water, acetone, alcohols, dimethoxytetraglycol. Many further examples of organic- and inorganic-based gel systems are known to those skilled in the art.

The cold packs may optionally contain additional constituents. Among these are phase change materials. Phase change materials store or release latent heat upon a change of phase from a solid phase to a liquid phase, from one solid phase to another solid phase, or vice versa.

Portion of Device Containing Material to be Heated or Cooled

At least one portion, or container, of the device can contain material to be heated, or alternatively, cooled. This portion of the device is not particularly variant if the material is to be heated or cooled. In either embodiment, insulation can be employed to maintain the heat or cold within the container, and also to maintain the temperature outside at a temperature which allows convenient handling by users.

In some embodiments, the material can be anything that is useful when heated, and especially when the material is to be used in a location that is typically remote from fixed heating sources. For example, the inventive device could be used for heating food or beverages out of doors without an external heat source. In another example, the inventive device could be used to heat adhesives, filler material, or other building material which is best used in a warmed state, and which is typically used at a construction site or other location where self-contained heating is useful. Suitable examples of material that can be used in connection with the inventive device useful for heating include water; foods, including foods which are made with water; adhesives; beauty products such as cosmetics and hair care products.

In other embodiments, the material can be anything that is useful when cooled, and especially when the material is to be used in a location that is typically remote from fixed cooling sources. For example, the inventive device could be used for cooling food or beverages out of doors without an external cold source. In another example, the inventive device could be used to cool material which is best used in a cooled state, and which is typically used at a location where self-contained cooling is useful. Suitable examples of material that can be used in connection with the inventive device useful for cooling include water; foods, including foods which are made with water.

The portion of the device adapted to contain material to be heated or cooled must be in thermal contact with the heat-producing element. This portion must be separated from the heat- or cold-producing element so that there is no fluid communication between these two components of the device. Generally, the portion to contain material to be heated or cooled can take the form of a materials container, or a pouch. The container should be able to be openable, preferably reopenable or repeatedly openable, and when closed, should be substantially fluid impermeable, or at least substantially liquid impermeable. Some gas permeability may be desirable in some embodiments.

Figure 5:
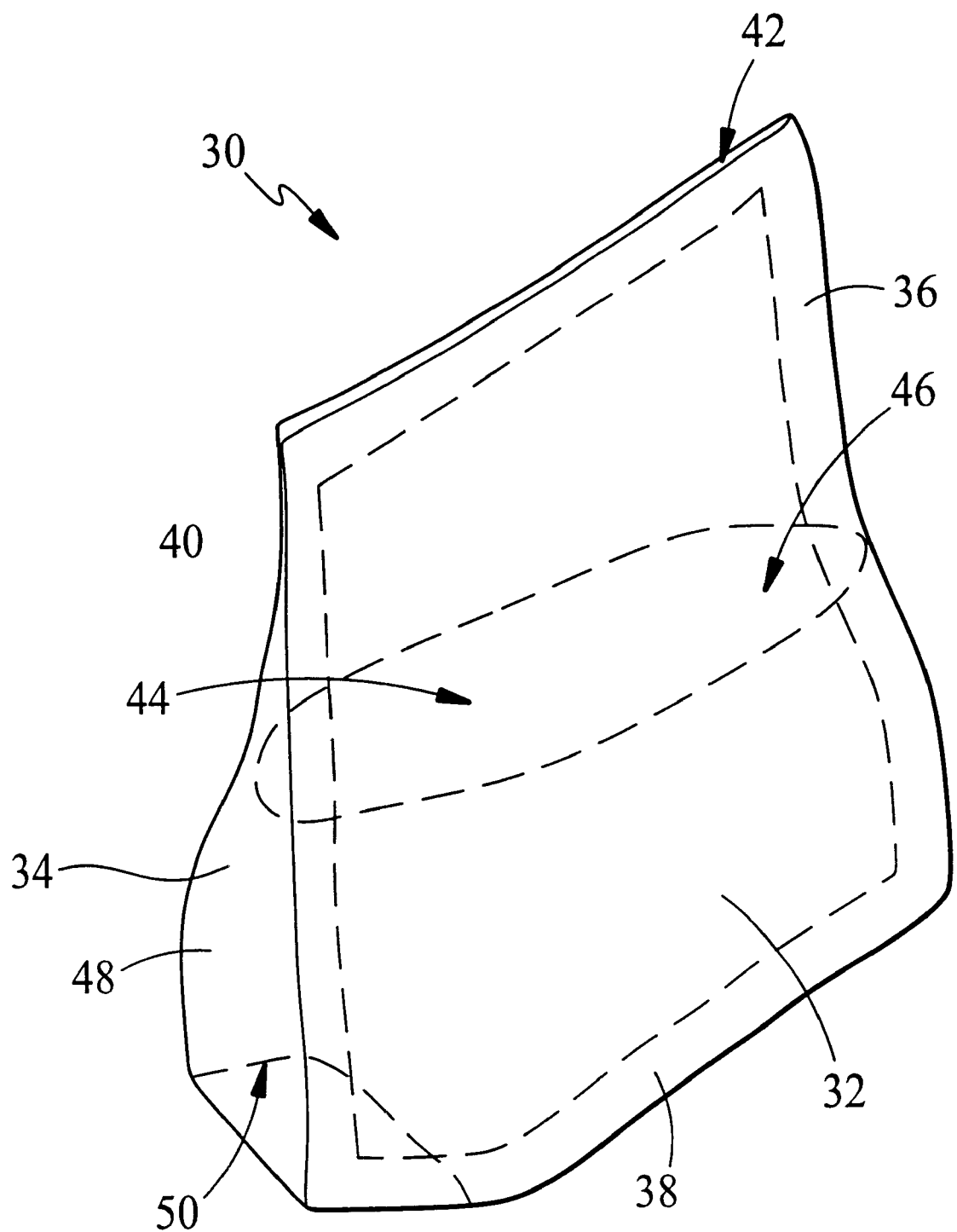
FIG. 5 is a perspective view of a particular embodiment of a heating/dispensing or cooling/dispensing device.

Referring to FIG. 5, a container 30 is shown. Container 30 includes panels 32 and 34 sealed together at their edges by edge seals 36, 38 and 40. These edge seals are preferably made so that they are not readily opened by the user. Another edge seal 42 is preferably made to be readily compromised by the user, and is preferably a repeatably openable edge seal 42. Alternate embodiments of the device are also contemplated. For example, there may be more than one openable edge seal 42, resulting in a container divided into more than two zones, each zone being separated by a seal within the peripheries of the panels 32 and 34. For example, the container 30 can be divided into halves by a seal made vertically midway between edge seals 36 and 40. The container 30 can also contain material 44 to be heated, as described above.

Panel 32 has an outer surface 46 which can form an area of contact between container 30 and a heat pack. For example, a heat pack having an external surface can be placed in intimate physical contact by abutting its external surface substantially to the outer surface 46 of panel 32. Optionally and desirably, the outer surface 48 of panel 34 can likewise be placed in intimate physical contact with the external surface of either the same or a different heat pack as that in contact with outer surface 46. FIG. 5 also shows gusset 50, which allows support of container 30 when in the upright position.

Figure 6:
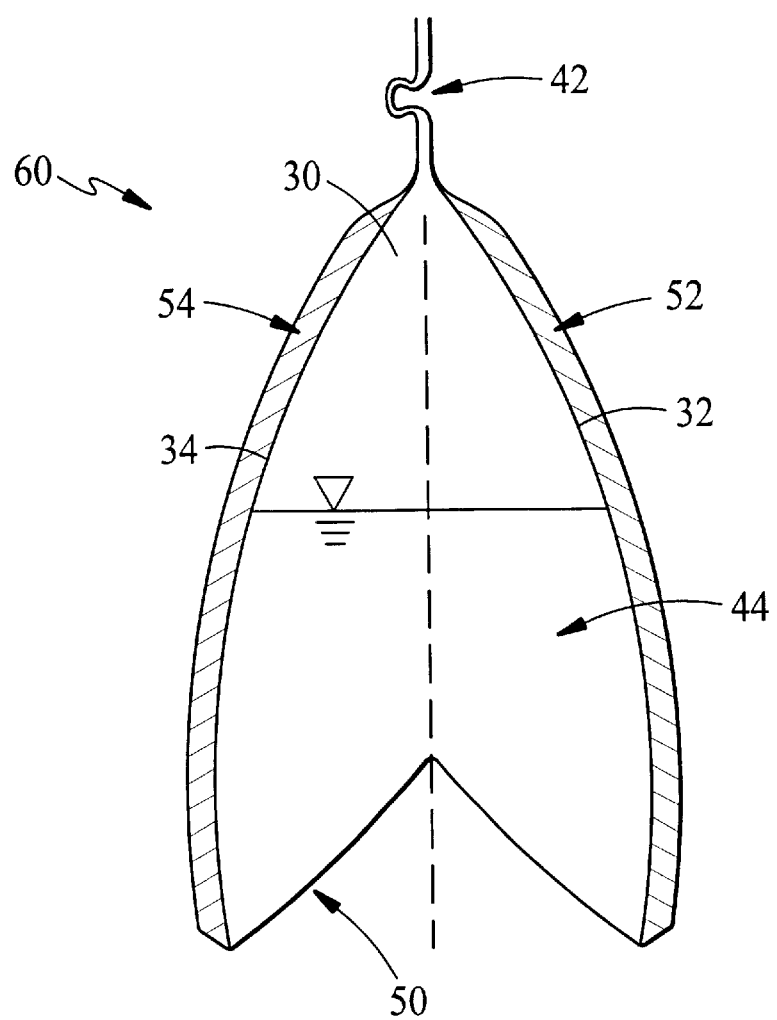
FIG. 6 is a side view of a particular embodiment of a heating/dispensing or cooling/dispensing device in an upright position.

FIG. 6 is a side view of heating/dispensing or cooling/dispensing device 60 in an upright position, including container 30. Openable edge seal 42 is also shown, here as a tongue-and-groove type resealable closure. This view shows heat packs (or cold packs) 52 and 54 in intimate physical contact with panels 34 and 32, respectively. Gusset 50 is also shown in an open position, enabling the device to stand.

Figure 7:
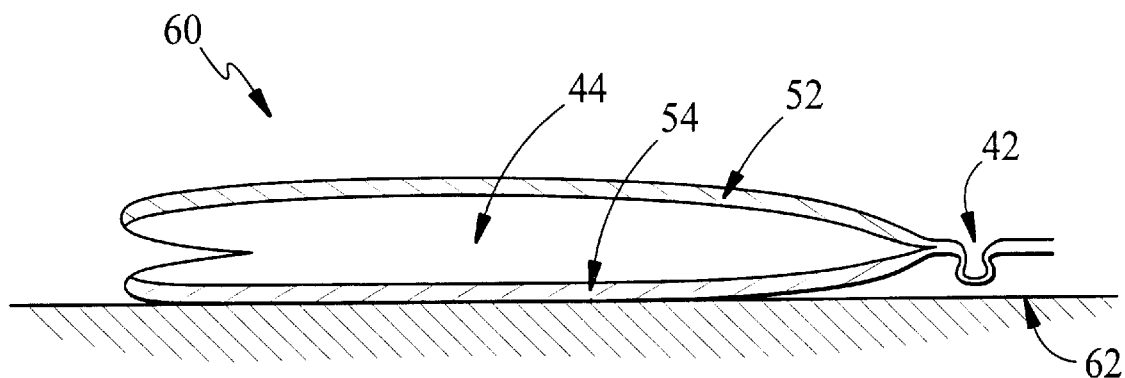
FIG. 7 is a side view of a particular embodiment of a heating/dispensing or cooling/dispensing device in a supine position.

FIG. 7 shows heating/dispensing or cooling/dispensing device 60 in a supine position on horizontal surface 62. As in all figures, like reference numbers indicate like elements in the figures. As seen, the material 44 tends to form a flat sheet, making its even and controlled heating or cooling more likely.

The container can comprise any material which is reasonably thermally conductive, is not deleteriously affected by the contents it is meant to hold, and is resistant to the temperature to be achieved. The container can have any degree of rigidity or flexibility. For example, the container can be made of a flexible material. Such materials include polyethylene, polypropylene, polyester (such as MYLAR®, film obtainable from DuPont) aluminum, aluminized polymer film, and other conventional plastic or other packaging materials suitable for containing heated liquids such as rubber, vinyl, vinyl-coated fabric and polyethylene. A thickness of about 0.02 mm to about 0.1 mm has been found to be satisfactory using clear vinyl.

In some embodiments, the container can be constructed of thin, flexible, thermally conductive material comprising an upper layer and a lower layer which are bonded together along much of the periphery of the layers. This bonding is not meant to be compromised by a user. At least a portion of the periphery is adapted to be openably and closably compromised by a user, or preferably repeatedly openable, to form a substantially liquid impermeable container, for example, a substantially planar envelope when closed. This portion of the periphery can be an opening, which is sealed for example by conventional means which allow repeated openability and closability. For example, the opening may be equipped with a repeatedly openable, malleable tongue-and-groove type seal such as a ZipLoc® seal.

In some preferred embodiments, the thermally conductive material is a metal foil, such as one composed substantially of aluminum or copper, or a metallized plastic film such as aluminized polyester, for example MYLAR®, or including for example, metallized SURLYN®. The edges of the material can be bonded together by any suitable means, for example, soldering, heat sealing, ultrasonic welding, solvent welding, fold sealing, or the use of adhesives.

In particular embodiments, the device is intended to stand upright at least at one particular time during the use of the device. An upright device can allow the opening of the container containing material to be heated or cooled, can allow mixing of other components to be added to this material, can allow dispensing of the material to be heated or cooled, whether the container is filled, partially filled or empty. For example, other components to be added to this material can be added in solid form, powder form, liquid form or other conveniently added forms. For example, the components to be added to this material could be provided in an auxiliary package attached to the container, such as for example, a powdered drink mix, instant coffee, dessert mix, flavoring or similar components for food or drink. The components could also be non-food components, such as components useful for cosmetic or construction materials.

Figure 8A:
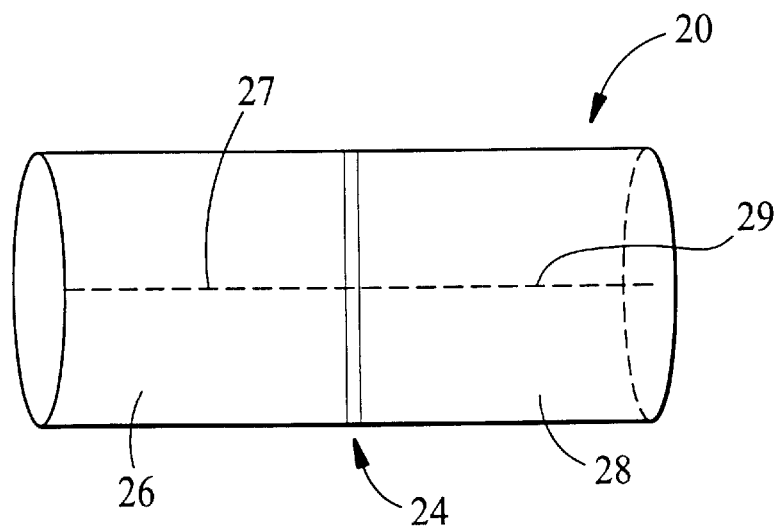
FIGS. 8A, 8B and 8C are views of a particular embodiment of a heating/dispensing or cooling/dispensing device constructed from a single sleeve including a pair of heat or cold packs.
Figure 8B:
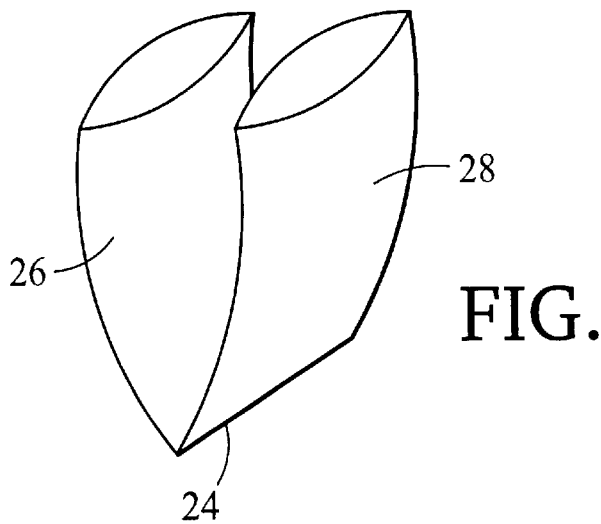
Figure 8C:
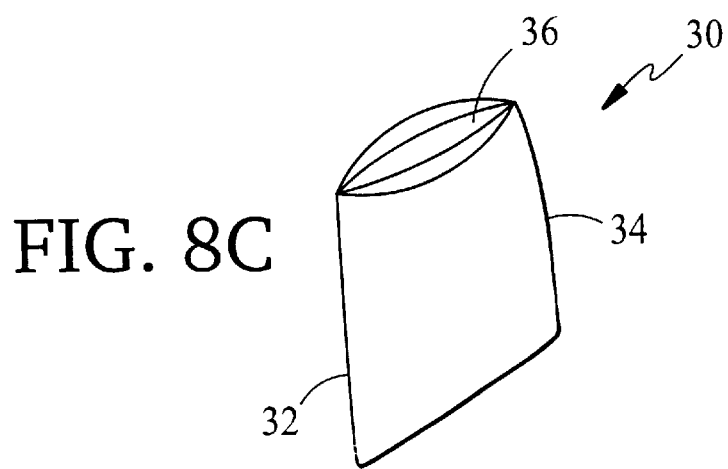

Alternately, the device could include a container having walls which are formed from the external surfaces of heat or cold packs. The external surfaces of at least one heat or cold pack could be adapted to form a pouch within which material could be heated or cooled. For example, if two rectangular heat or cold packs were joined at three of their edges with edge seals, the fourth edge could serve as an opening, to be equipped with a resealable closure. A single sleeve which comprises a heat or cold pack could be folded back upon itself to create a space within the folded region which can contain material to be heated or cooled. Such a configuration is shown in FIG. 8. In FIG. 8A, sleeve 20 is shown with a fold 24, which can separate two separate heat or cold packs 26 and 28. The separate packs 26 and 28 are each further divided into zones containing reactants to make heat or cold. Frangible separations 27 and 29 are shown in FIG. 8. FIG. 8B shows the folded configuration in which packs 26 and 28 form two opposing surfaces, and FIG. 8C shows container 30 fully formed, with sides 32 and 34 (not shown directly) sealed, and side 36 left unsealed, or in preferred embodiments, equipped with reversible seal, as described herein.

In some embodiments, the container is adapted to include elements that allow the device to stand upright (that is, with the opening upward, so that the contents do not readily spill or flow out of the container). This can be accomplished by constructing the bottom region of the container so that sufficient support is given to the device that the opening remains upright whether the container is filled with material, or not. For example, the container can be equipped with gussets so that the bottom region of the container, particularly the portion which would rest directly on a horizontal surface, has a larger contact region than would obtain without such support.

Alternatively, the bottom region of the container can be equipped with stiffening support members, such as those present along lower edges of the container. In other embodiments, the support necessary for the device to stand upright can be provided by other components in the device, such as the heat- or cold-producing elements, either in conjunction with support provided by the container, or wholly independently thereof.

The container should be in thermal contact with the heat- or cold-producing elements, and this can be made possible, for example, by direct contact of the walls of the heat or cold pack. In some preferred embodiments, the walls of the heat- or cold-producing elements are substantially in physical contact with the walls of the container. For example, in FIG. 5 the device can include a container in the form of an envelope-shaped pouch, in physical contact on each surface with a substantially similarly shaped heat or cold pack. Alternatively, the device can include a container in the envelope form with only one of such heat or cold packs, in physical contact with only a single surface of the container. Alternatively, a single heat or cold pack can "wrap around" the envelope-shaped container. Generally, the container and at least one heat pack form a container/heat pack or container/cold pack assembly, in that these components are generally intimately associated by substantial physical contact, thus facilitating heat transfer from or to the heat or cold pack component to the container. Materials which promote such physical contact can be intermediate the heat or cold pack and container, for example, adhesive materials. If any such materials are present in the heat path, they are desirably highly heat conductive and able to maintain their integrity upon heat transfer.

Optionally, and in some embodiments desirably, the device can further include features such as insulation completely or substantially surrounding the container/heat pack or container/cold pack assembly. Such insulation can be of any type that is able to withstand heating or cooling without losing its insulative property. Such insulation can possess some rigidity, if this property is desired to contribute to the ability of the device to stand upright.

The invention further includes methods for heating or, alternatively, cooling material in a device as described in the claims, for example as illustrated above. The method includes providing a device including heat- or cold-producing elements, a region adapted to contain the material to be heated or cooled, and any optional components such as insulation. As a first step, the heat- or cold-producing elements are activated so that heat or cold is produced. This step may include some manipulation of the heat- or cold-producing elements so that the ingredients that produce heat or cold are sufficiently evenly distributed that heat or cold production is well behaved. Soon thereafter, as convenient, the material to be heated or cooled can be introduced into the region adapted to contain such material. Generally, the heat- or cold-producing elements are of sufficient power that this operation is most conveniently performed within a minute or so, although various embodiments can be constructed that would lengthen or shorten this time. The material to be heated or cooled can completely or partially fill the container region. After filling, the container region can be closed. This can be desirable to minimize heat or cold loss to the environment, thereby maximizing the heating or cooling effect of the heat or cold producing elements. If the container region is closed, the device can be laid on its side. This can be desirable to produce a layer of material to be heated which is as flat as a flexible container will allow. If the material to be heated or cooled is fluid and relatively free-flowing, and the container and heat- or cold-producing elements are relatively flexible, laying the device on its side will tend to maximize the even temperature distribution of the contents. Further to this end, it is considered desirable that the material to be heated or cooled forms a thin, flat sheet, so that laying the device on its side can facilitate the material forming such a sheet.

After heating or cooling is carried out to the requirements of the particular use for which the device is put, the device can be stood upright and the container region opened and the material used as desired. The act of setting the device upright also contributes to further useful heating or cooling of the material inside. For example, heat- or cold-producing ingredients, which can continue to produce heat or cold (if they are not yet exhausted), can, in some embodiments, settle to the bottom of the heat- or cold-producing elements, and can continue to heat or cool the material as it is dispensed from the container region, for example, if it is dispensed gradually.

If the material heated or cooled is water, instant hot or cool beverages of kinds including for example, coffee, tea, cocoa, or juices can be prepared by adding appropriate additives such as powders or syrups. Instant foods such as noodles, oatmeals, rice, pasta or soups can be prepared by adding appropriate dry or non-dry ingredients.

Alternatively, the device can contain material that does not require any substantial additive, such as pre-made soups, stews, puddings, and the like. In such cases, the container region, together with the heat- or cold-producing elements if necessary, can be constructed to survive autoclaving processes.

OTHER EMBODIMENTS

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. A self-contained flexible heating and dispensing device capable of standing upright during use, comprising
   a) a gusseted container of edge-sealable, flexible sheet material comprising a first sheet forming a generally rectangular first side panel having a first top edge and at least one end panel having a gusset, a second sheet forming a second side panel opposite said first side panel and having a second top edge, permanent edge seals joining said second sheet to form a container with a gusseted end panel that is open along a top comprising said first and second top edges;
   b) a user-openable closure for securing said second top edge to said first top edge and closing said container at said top; and
   c) at least one user-activatable, disposable heat pack in thermal contact with one of said first and second side panels.

2. The device of claim 1 wherein one of said side panels forms a wall of said at least one heat pack.

3. The device of claim 1 comprising two heat packs, wherein each of said side panels forms a wall of one of said heat packs.

4. The device of claim 3 wherein said heat packs include a gelling agent that forms a gel upon activation of the heat packs.

5. The device of claim 1 wherein said at least one heat pack includes a gelling agent that forms a gel upon activation of the at least one heat pack.

6. The device of claim 5 wherein said at least one heat pack includes a phase-change material.

7. The device of claim 1 wherein said user-openable closure is reversibly openable.

8. The device of claim 1 wherein said first sheet and said second sheet are selected from the group consisting of polyethylene, polypropylene, polyester, metal foil, metallized plastic film, rubber, vinyl and vinyl-coated fabric.

9. A self-contained flexible cooling and dispensing device capable of standing upright during use, comprising
   a) a gusseted container of edge-sealable, flexible sheet material comprising a first sheet forming a generally rectangular first side panel having a first top edge and at least one end panel having a gusset, a second sheet forming a second side panel opposite said first side panel and having a second top edge, permanent edge seals joining said second sheet to form a container with a gusseted end panel that is open along a lop comprising said first and second top edges;
   b) a user-openable closure for securing said second top edge to said first top edge and closing said container at said top; and
   c) at least one user activatable, disposable cold pack in thermal contact with one of the first and second side panels.

10. The device of claim 9 wherein one of said side panels forms a wall of said at least one cold pack.

11. The device of claim 9 comprising two cold packs, wherein each of said side panels forms a wall of one of said cold packs.

12. The device of claim 11 wherein said cold packs include a gelling agent that forms a gel upon activation of the cold packs.

13. The device of claim 9 wherein said at least one cold pack includes a gelling agent that forms a gel upon activation of the at least one cold pack.

14. The device of claim 13 wherein said at least one cold pack further involves a phase-change material.

15. The device according to claim 9 wherein said user-openable seal is reversibly openable.

16. The device according to claim 9 wherein said first sheet and said second sheet are selected from the group consisting of polyethylene, polypropylene, polyester, metal foil, metallized plastic film, rubber, vinyl and vinyl-coated fabric.

* * * * *